(12) United States Patent
Okajima et al.

(10) Patent No.: US 10,831,746 B2
(45) Date of Patent: Nov. 10, 2020

(54) QUERY GENERATION METHOD, QUERY GENERATION APPARATUS, AND COMPUTER-READABLE RECORDING MEDIUM

(71) Applicant: FUJITSU LIMITED, Kawasaki-shi, Kanagawa (JP)

(72) Inventors: Seiji Okajima, Kawasaki (JP); Hiroaki Morikawa, Kawasaki (JP); Fumihito Nishino, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 16/204,269

(22) Filed: Nov. 29, 2018

(65) Prior Publication Data

US 2019/0188198 A1    Jun. 20, 2019

(30) Foreign Application Priority Data

Dec. 19, 2017  (JP) ................... 2017-243104

(51) Int. Cl.
*G06F 16/242* (2019.01)
*G06F 16/28* (2019.01)
*G06F 16/21* (2019.01)
*G06F 17/10* (2006.01)

(52) U.S. Cl.
CPC ........ *G06F 16/2423* (2019.01); *G06F 16/211* (2019.01); *G06F 16/285* (2019.01); *G06F 17/10* (2013.01)

(58) Field of Classification Search
CPC .... G06F 16/2423; G06F 16/242; G06F 16/24; G06F 16/211; G06N 5/02
See application file for complete search history.

(56) References Cited

U.S. PATENT DOCUMENTS

| 8,620,909 B1 * | 12/2013 | Rennison | G06F 16/319 707/723 |
| 2007/0055655 A1 * | 3/2007 | Bernstein | G06F 16/211 |
| 2007/0185868 A1 * | 8/2007 | Roth | G06F 16/80 |

OTHER PUBLICATIONS

Rahm, E., Bernstein, P. A survey of approaches to automatic schema matching. Dec. 2001 The VLDB Journal 10, 334-350. (Year: 2001).*

(Continued)

*Primary Examiner* — Tamara T Kyle
*Assistant Examiner* — Lana Alagic
(74) *Attorney, Agent, or Firm* — Staas & Halsey LLP

(57) ABSTRACT

A non-transitory computer-readable recording medium stores therein a query generation program that causes a computer to execute a process including: determining, from a plurality of category schemas each being a set of attribute schemas, a main category schema to be associated with an output target table that defines acquisition target data, based on attribute names of a plurality of output items contained in the output target table; determining a subcategory schema to be associated with an un-associated item, which is an output item that is not associated with the main category schema among the plurality of output items, from category schemas that are associated with respective features of a plurality of attribute schemas contained in the main category schema; and generating queries with respect to the plurality of category schemas based on the main category schema and the subcategory schema.

6 Claims, 14 Drawing Sheets

(56) References Cited

OTHER PUBLICATIONS

"Fujitsu's LOD technology", Fujitsu Laboratories Ltd., Online Resource, URL: http://www.fujitsu.com/jp/group/labs/resources/tech/techguide/list/lod/p06.html, searched on Oct. 1, 2017.**

* cited by examiner

FIG.5

| NAME | CURRENT TEAM NAME | LEAGUE NAME | AGE | PLAYING POSITION | DOMINANT FOOT |
|---|---|---|---|---|---|
| | | | | | |
| | | | | | |

FIG.6

| FOOTBALL PLAYER |
|---|
| NAME |
| TEAM |
| DATE OF BIRTH |
| PLAYING POSITION |
| DOMINANT FOOT |

| VOLLEYBALL PLAYER |
|---|
| NAME |
| TEAM |
| DATE OF BIRTH |
| PLAYING POSITION |
| HEIGHT |

| VOLLEYBALL TEAM |
|---|
| TEAM NAME |
| REPRESENTATIVE |
| CURRENT LEAGUE |

| FOOTBALL TEAM |
|---|
| TEAM NAME |
| REPRESENTATIVE |
| CURRENT LEAGUE |
| HOMETOWN |

FIG.9

```
PREFIX rdfs: <http://www.w3.org/2000/01/rdf-schema#>
PREFIX ex: <http://example/> select distinct *
where {
 ?s1 a ex:FOOTBALL PLAYER .
 ?s2 a ex:FOOTBALL TEAM .
OPTIONAL { ?s1 ex:NAME/rdfs:label ?o1 . }
OPTIONAL {
 {?s1 ex:TEAM OF FOOTBALL PLAYER/rdfs:label ?o2 . } UNION { ?s2 ex:TEAM OF FOOTBALL PLAYER/rdfs:label ?o2 . }
}
OPTIONAL { ?s1 ex:DATE OF BIRTH/rdfs:label ?o3 . }
OPTIONAL { ?s1 ex:POSITION/rdfs:label ?o4 . }
OPTIONAL { ?s1 ex:DOMINANT FOOT/rdfs:label ?o5 . }
OPTIONAL { ?s2 ex:CURRENT LEAGUE/rdfs:label ?o6 . }
}
```

QUERY GENERATION METHOD, QUERY GENERATION APPARATUS, AND COMPUTER-READABLE RECORDING MEDIUM

CROSS-REFERENCE TO RELATED APPLICATION

This application is based upon and claims the benefit of priority of the prior Japanese Patent Application No. 2017-243104, filed on Dec. 19, 2017, the entire contents of which are incorporated herein by reference.

FIELD

The embodiments discussed herein are related to a computer-readable recording medium, a query generation method, and a query generation apparatus.

BACKGROUND

In recent years, with the development of open data movement, highly public data has been made available, as open data, to the public at large. When a user utilizes the open data, the user generates an output target table in which desired items are set, and generates a query for the open data in accordance with the items of the output target table. Then, the user executes the query and acquires desired data from the open data.

Non Patent Document 1: "Fujitsu's LOD technology", [online], Fujitsu Laboratories Ltd., [searched on 2017, 10, 1], Internet (URL: http://www.fujitsu.com/jp/group/labs/resources/tech/techgui de/list/lod/p06.html)

However, each of items in each of tables of the open data and each of items in an output target table desired by the user may be erroneously associated with one another, and a query for acquiring data may be erroneously generated. Therefore, in some cases, it may be difficult to effectively use the open data.

For example, when each of the items of the output target table is to be associated, tables to be associated are sequentially determined from all of available tables in the open data; however, in some cases, it may be requested to determine whether a table to be associated is appropriate from a small number of items. In this situation, when, in particular, there are a large number of available tables and items to be associated have general names, it is highly likely that the items are erroneously associated. In addition, when appropriateness of associations is determined using information other than the names of the items, a large amount of time and resources may be needed depending on the size of open data.

SUMMARY

According to an aspect of the embodiment, a non-transitory computer-readable recording medium stores therein a query generation program that causes a computer to execute a process including: determining, from a plurality of category schemas each being a set of attribute schemas, a main category schema to be associated with an output target table that defines acquisition target data, based on attribute names of a plurality of output items contained in the output target table; determining a subcategory schema to be associated with an un-associated item, which is an output item that is not associated with the main category schema among the plurality of output items, from category schemas that are associated with respective features of a plurality of attribute schemas contained in the main category schema; and generating queries with respect to the plurality of category schemas based on the main category schema and the subcategory schema.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram for explaining information stored in an output target information DB;

FIG. 6 is a diagram for explaining information stored in a category schema DB;

FIG. 9 is a diagram illustrating an example of a query;

DESCRIPTION OF EMBODIMENT(S)

Preferred embodiments will be explained with reference to accompanying drawings. The present invention is not limited by the embodiments below. In addition, the embodiments may be combined appropriately as long as no contradiction is derived.

[a] First Embodiment

Overall Configuration

Figure 1:
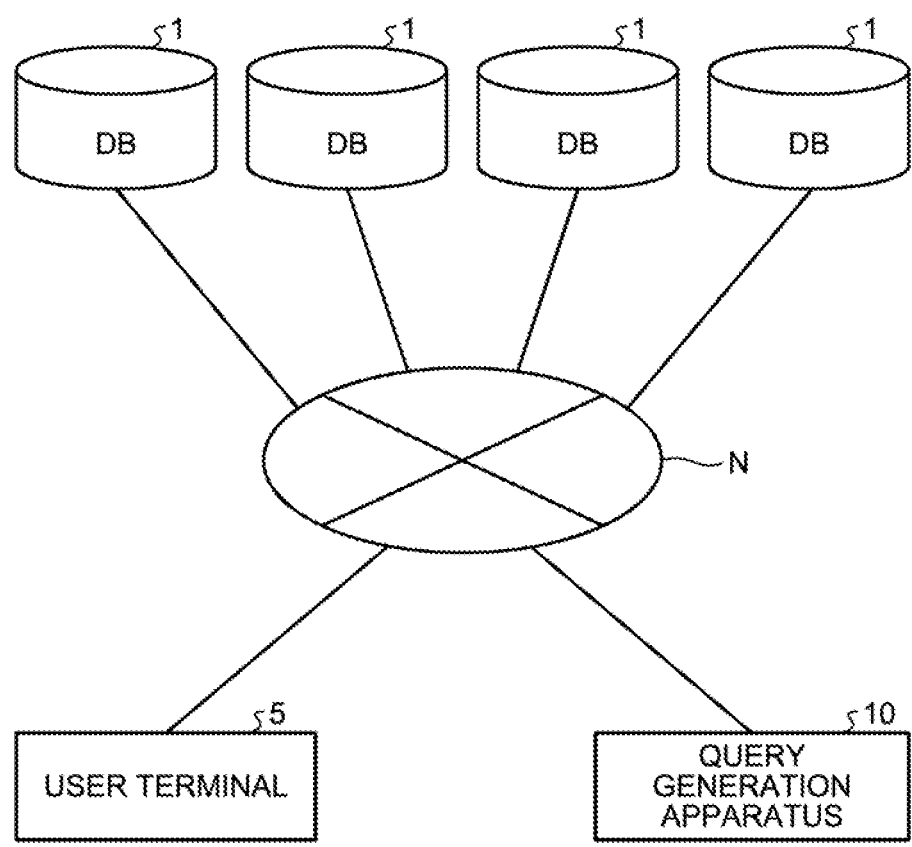
FIG. 1 is a diagram illustrating a configuration example of an entire system according to a first embodiment.

FIG. 1 is a diagram illustrating a configuration example of an entire system according to a first embodiment. As illustrated in FIG. 1, the system includes a plurality of databases (DBs) 1, a user terminal 5, and a query generation apparatus 10, all of which are communicably connected to one another via a network N. As for the network N, various communication networks, such as the Internet, may be adopted regardless of whether it is wired or wireless.

The plurality of DBs 1 are one example of a database, a database server, and the like for storing open data that is made available all over the world. The data stored herein is called linked open data (LOD), a knowledge graph, or the like, is made available to the public using a cloud system or the like, and can be used arbitrarily. In the present embodiment, a knowledge graph will be described as one example.

The user terminal 5 is one example of a computer apparatus, such as a smartphone, a personal computer, or a server. The user terminal 5 generates an output target table in which desired items are set, and acquires data corresponding to the items of the output target table from the knowledge graph.

The query generation apparatus 10 is one example of a computer apparatus that generates a query for acquiring data from the knowledge graph. Specifically, the query generation apparatus 10 receives the output target table from the user terminal 5, and generates a query for acquiring data corresponding to the output target table from the knowledge graph. Then, the query generation apparatus 10 transmits the generated query to the user terminal 5. As a result, the user terminal 5 is able to acquire the data corresponding to the output target table from the knowledge graph by executing the query.

Figure 2:
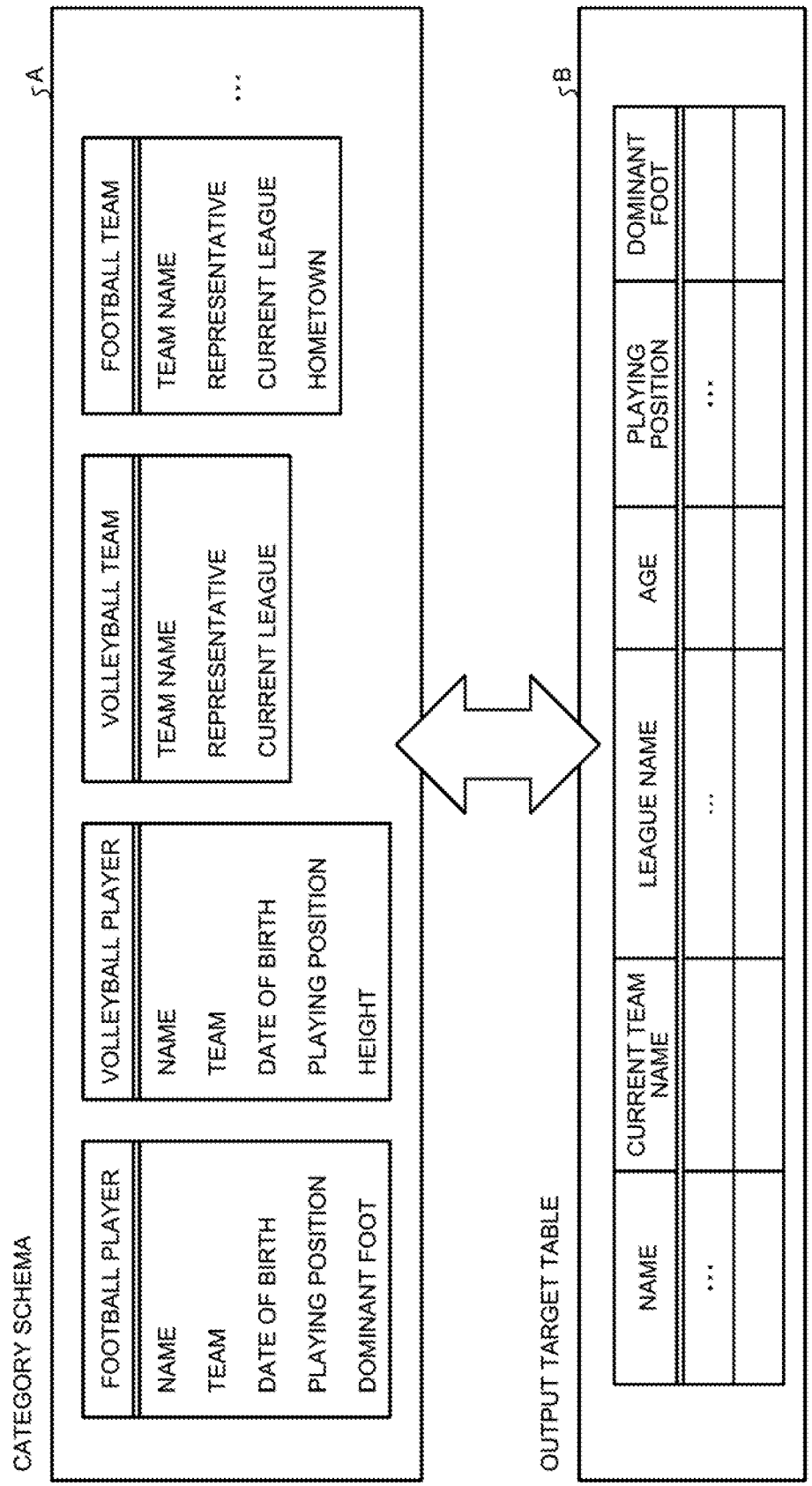
FIG. 2 is a diagram for explaining how to make associations with a table.

Here, difficulty in generating the query when the user generates the query will be described. Specifically, a process of making an association between each of the items of the output target table and each of items included in the knowledge graph by the user will be described with reference to FIG. 2. FIG. 2 is a diagram for explaining how to make associations with a table.

First, the knowledge graph will be described. The knowledge graph includes a plurality of category schemas. Each of the category schemas is information on an attribute obtained from the knowledge graph, and includes attribute schemas represented by the graph and a category name that is a name of the category schema. In other words, the category schema is a set of the attribute schemas represented by the knowledge graph, and the attribute schemas are information on attributes represented by the knowledge graph. Further, attribute names are used as names of the attribute schemas in the knowledge graph and used as item names in the output target table, where the names are character strings.

More detailed explanation is given with reference to FIG. 2. A in FIG. 2 is a knowledge graph including each of category schemas. For example, a category schema with a category name of "football player" includes "name, team, date of birth, playing position, and dominant foot", as attribute schemas. Here, each of "name, team, date of birth, playing position, and dominant foot" corresponds to an attribute name. Further, B in FIG. 2 is an example of the output target table generated by the user, and each of "name, current team name, league name, age, playing position, and dominant foot" corresponds to an attribute name.

In this situation, the user thinks about associations between the category schemas in the knowledge graph and the output target table in order to issue a query. Specifically, associations between each of the category schemas in the knowledge graph and the output target table are sequentially obtained. At this time, in general, optimal association relationships between the attribute names are selected by using a similarity index, such as partial match between character strings, and the order of assignment of the category schemas is determined using an index, such as a coverage with respect to the number of attribute names.

However, when associations are made in sequence, it is requested to determine an association relationship from a small number of attribute names. In this situation, if there are a large number of category schemas to be associated, or if the attribute names of the output target table are general names, the probability of erroneously associating the items increases. In other words, it is difficult for a general user to make associations accurately.

Figure 3:
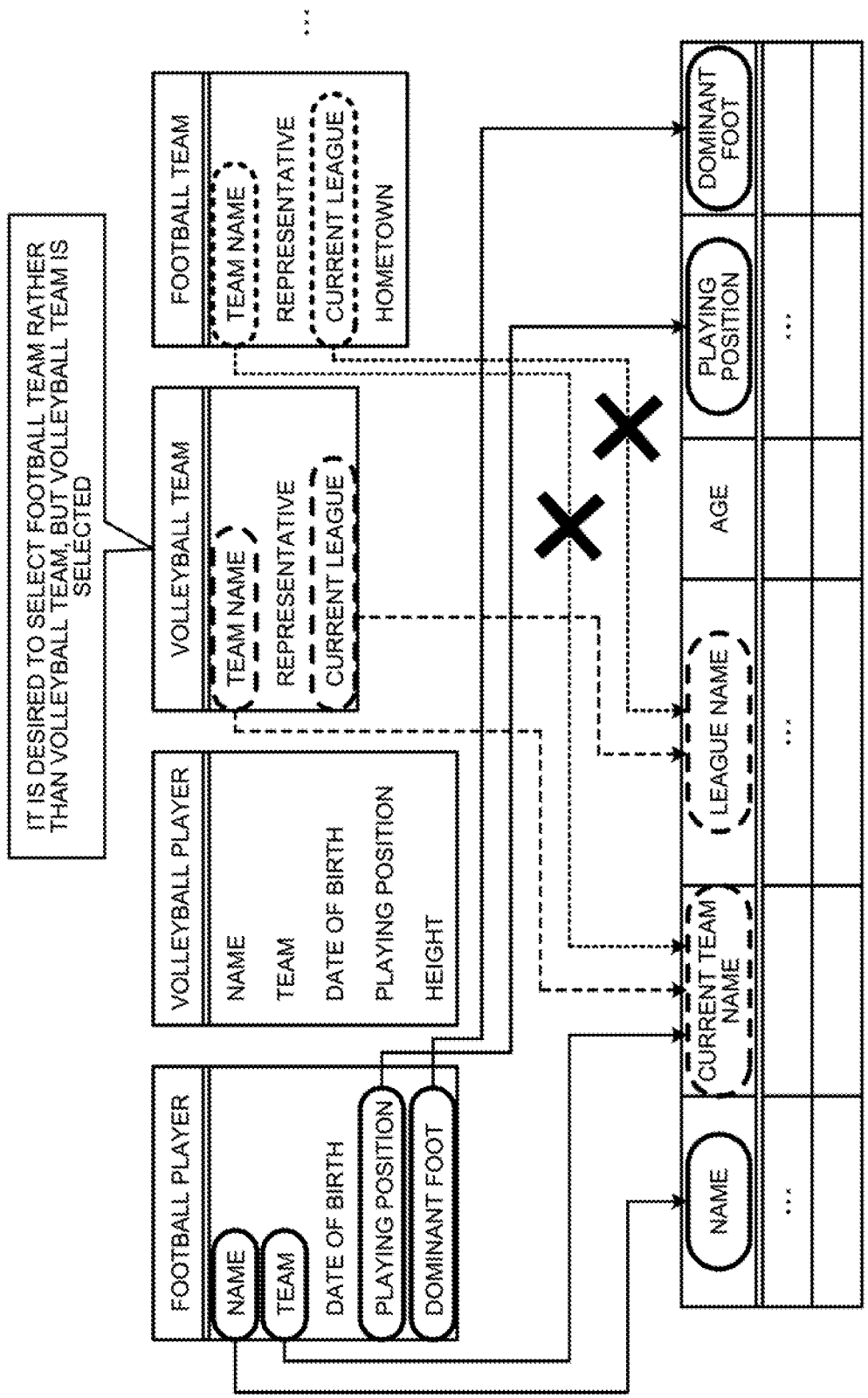
FIG. 3 is a diagram for explaining difficulty in making associations with a table.

FIG. 3 is a diagram for explaining difficulty in making associations with the table. As illustrated in FIG. 3, each of the attribute names of the output target table and each of the attribute schemas of each of the category schemas are compared with each other, and a coverage with respect to the attribute names is calculated. In this example, four out of the five attribute schemas included in the category schema of "football player" are similar to the attribute names of the output target table; therefore, "football player" is selected as a category schema with the highest coverage.

Then, the user associates each of the attribute schemas of "name, team, playing position, and dominant foot" in the category schema of "football player" with each of the attribute names of "name, current team name, playing position, and dominant foot" of the output target table.

Subsequently, each of the attribute names of the output target table and each of the attribute schemas of each of the category schemas other than "football player" are compared with each other, and a coverage with respect to the attribute names is calculated. In this example, two out of the three attribute schemas included in the category schema of "volleyball team" are similar to the attribute names of the output target table; therefore, "volleyball team" is selected as a category schema with the second highest coverage. However, in this example, selecting "football team" rather than "volleyball team" is the correct thing to do. In this manner, with use of only the coverage like in the general technique, associations may be made erroneously and a user can hardly notice the mistake.

To cope with this, the query generation apparatus 10 according to the first embodiment, when sequentially determining category schemas to be associated with the output target table, first determines a main category schema and subsequently lists association candidates from ranges of attribute schemas included in the already-associated main category schema. Then, the query generation apparatus 10 calculates associations between the listed category schemas and the output target table, and determines a category schema (subcategory schema) to be associated.

In other words, the query generation apparatus 10 narrows down the association candidates using various kinds of information included in the knowledge graph, and makes associations with the output target table. As a result, the query generation apparatus 10 is able to reduce errors in queries for executing data acquisition.

Functional Configuration

Figure 4:
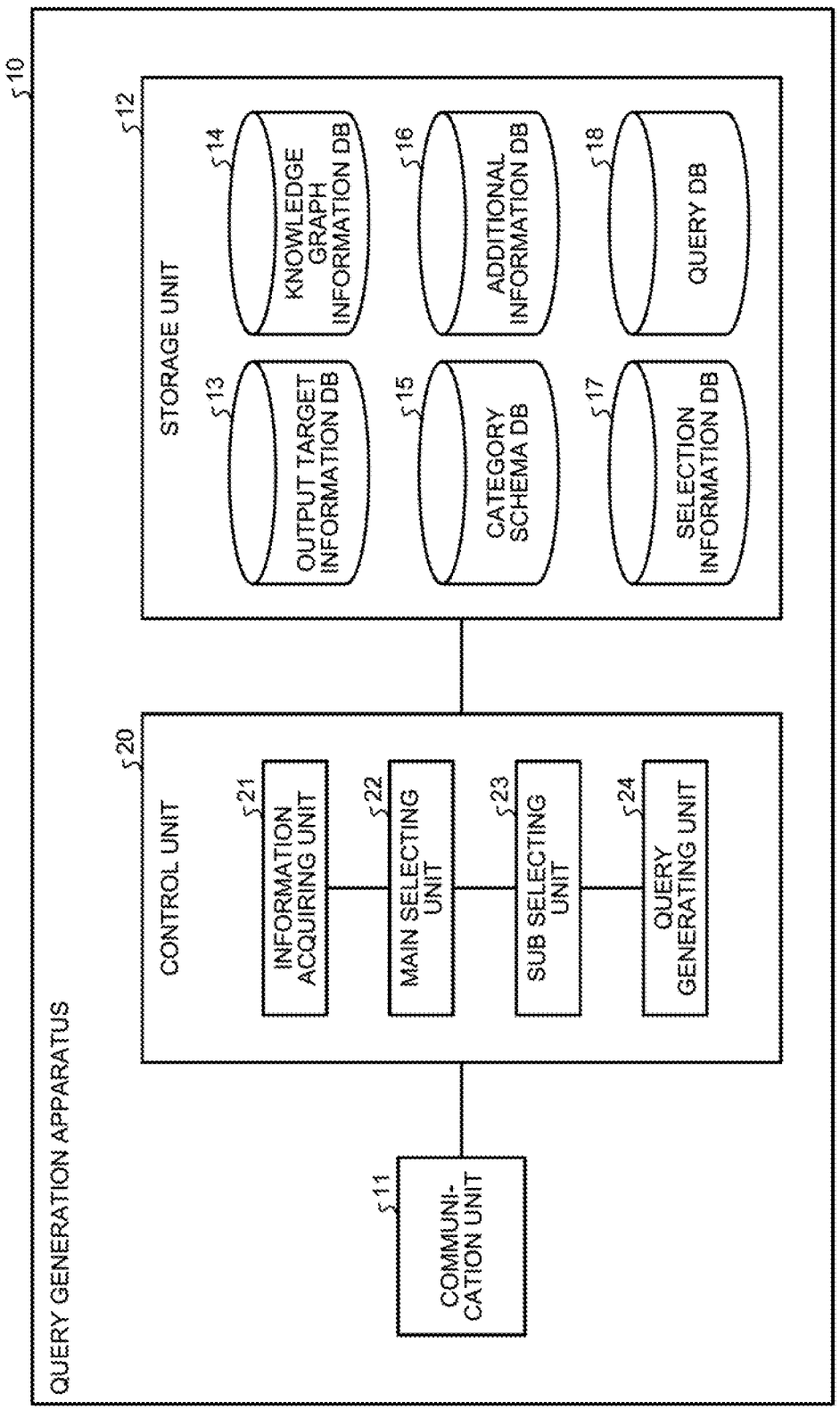
FIG. 4 is a functional block diagram illustrating a functional configuration of a query generation apparatus according to the first embodiment.

FIG. 4 is a functional block diagram illustrating a functional configuration of the query generation apparatus 10 according to the first embodiment. As illustrated in FIG. 4, the query generation apparatus 10 includes a communication unit 11, a storage unit 12, and a control unit 20.

The communication unit 11 is a processing unit that controls communication with other apparatuses, and is, for example, a communication interface or the like. For example, the communication unit 11 acquires a knowledge graph from each of the DBs 1, acquires an output target table from the user terminal 5, and transmits a query to the user terminal 5.

The storage unit 12 is one example of a storage device that stores therein data and a program, and is, for example, a memory, a hard disk, or the like. The storage unit 12 stores therein an output target information DB 13, a knowledge graph information DB 14, a category schema DB 15, an additional information DB 16, a selection information DB 17, and a query DB 18.

The output target information DB 13 is a database for storing an output target table generated by a user. FIG. 5 is a diagram for explaining information stored in the output target information DB 13. As illustrated in FIG. 5, the output target information DB 13 stores therein an output target table that contains each of "name, current team name, league name, age, playing position, and dominant foot" as an attribute name. In other words, the user examines whether to generate a query for acquiring, from the knowledge graph, data corresponding to each of "name, current team name, league name, age, playing position, and dominant foot".

The knowledge graph information DB 14 is a database for storing information related to the knowledge graph. For example, the knowledge graph information DB 14 stores therein a storage location of each of the category schemas on a cloud system. The information stored herein may be stored by an administrator or the like, or may be acquired from the knowledge graph.

The category schema DB 15 is a database for storing information related to each of the category schemas included in the knowledge graph. FIG. 6 is a diagram for explaining information stored in the category schema DB 15. As illustrated in FIG. 6, the category schema DB 15 stores therein each of category schemas with category names of "football player", "volleyball player", "volleyball team", and "football team".

In addition, the category schema of "football player" contains "name, team, date of birth, playing position, and dominant foot" as attribute schemas. Similarly, the category schema of "volleyball player" contains "name, team, date of birth, playing position, and height" as attribute schemas. The category schema of "volleyball team" contains "team name, representative, and current league" as attribute schemas. The category schema of "football team" contains "team name, representative, current league, and hometown" as attribute schemas.

As one example, the category schema DB 15 stores therein, as a category schema with a category name of "football player=Patent Taro", "name=Patent taro, team=patent team, date of birth=Jan. 1, 2000, playing position=forward (FW), and dominant foot=right", for example. Further, the category schema DB 15 stores therein, as a category schema with a category name of "football team=patent team", "team name=patent team, representative=Yamada Taro, current league=Japanese professional league, and hometown=Tokyo", for example.

Figure 7:
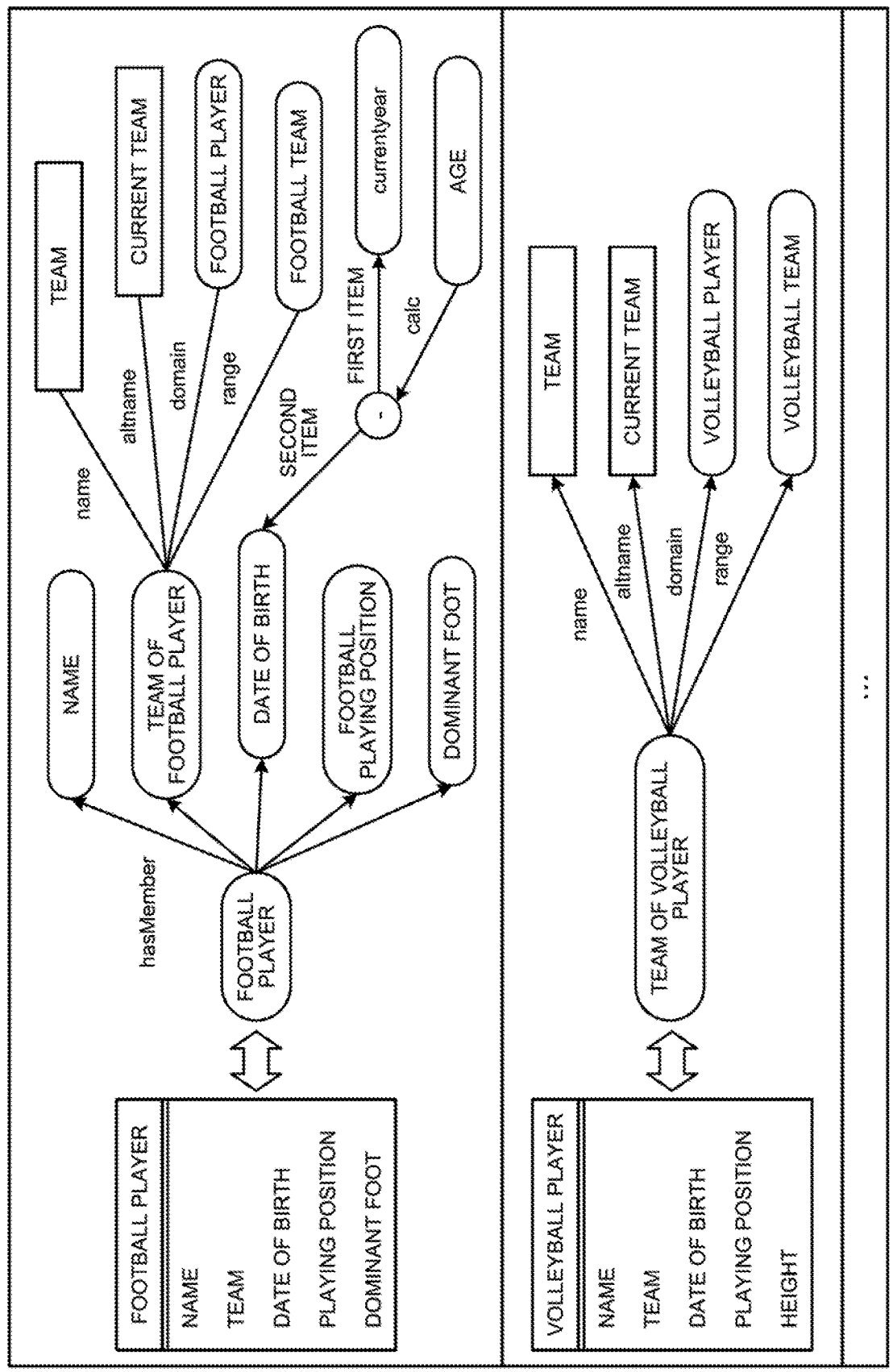
FIG. 7 is a diagram for explaining information stored in an additional information DB.

The additional information DB 16 is a database for storing information on the attributes obtained from the knowledge graph and information on the category schemas, in the same graph format as the knowledge graph. FIG. 7 is a diagram for explaining information stored in the additional information DB 16. As illustrated in FIG. 7, the additional information DB 16 stores therein alternative name, weight, domain, range, calculation formula, and the like as additional information on the attribute schemas contained in the category schema, for each of the category schemas.

For example, as illustrated in FIG. 7, the additional information DB 16 stores therein, as additional information on the attribute schema of "team" of the category schema of "football player", "team" as a name (name), "current team" as an alternative name (altname), "football player" as a domain (domain), and "football team" as a range (range). Further, the additional information DB 16 stores therein, as additional information on the attribute schema of "date of birth" of the category schema of "football player", "currentyear" as a first item, "date of birth" as a second item, and calculability (calc) of "age" by "currentyear"-"date of birth".

The selection information DB 17 is a database for storing a category schema that is selected by the control unit 20 to be described later. Specifically, the selection information DB 17 stores therein a category schema to be associated with the output target table.

The query DB 18 is a database for storing a query generated by the control unit 20 to be described later. Specifically, the query DB 18 stores therein a query for acquiring data corresponding to each of the attribute names of the output target table from a category schema in which data is stored.

The control unit 20 is a processing unit that controls the entire query generation apparatus 10, and is, for example, a processor or the like. The control unit 20 includes an information acquiring unit 21, a main selecting unit 22, a sub selecting unit 23, and a query generating unit 24. The information acquiring unit 21, the main selecting unit 22, the sub selecting unit 23, and the query generating unit 24 are examples of electronic circuits included in the processor or examples of processes performed by the processor.

The information acquiring unit 21 is a processing unit that acquires various kinds of information from other apparatuses, and stores the information in a corresponding DB in the storage unit 12. For example, the information acquiring unit 21 acquires an output target table from the user terminal 5, and stores the output target table in the output target information DB 13. Further, the information acquiring unit 21 acquires information on a category schema from the knowledge graph (each of the DBs 1), and stores the category scheme in the knowledge graph information DB 14. Furthermore, the information acquiring unit 21 acquires a category schema from the knowledge graph (each of the DBs 1), and stores the category schema in the category schema DB 15.

The main selecting unit 22 is a processing unit that selects a main category schema corresponding to the output target table from a plurality of category schemas each being a set of attribute schemas, based on attribute names of a plurality of output items included in the output target table. Specifically, the main selecting unit 22 calculates similarities between the attribute names of each of the category schemas and the attribute names of the output target table, and calculates a similarity between each of the category schemas and the output target table. Then, the main selecting unit 22 determines the category schema with the highest similarity as the main category schema.

For example, the main selecting unit 22 calculates a similarity between each of the attribute schemas of the category schema of "football player" and the attribute names of the output target table. First, the main selecting unit 22 searches for an attribute name with a longest common sequence with respect to "name" of the football player. In this example, the main selecting unit 22 performs calculation such that "LCS(football player. name, output target table. name)/max(length(football player. name), length(output target table. name))". In other words, the main selecting unit 22 calculates a similarity="2/2"=1 from "(LCS(football player. name, output target table. name)=2)/(max(length (football player. name)=2, length(output target table. name) =2)=2)". Meanwhile, "football player. name" represents the attribute name of "name" of the category schema of "football player".

Subsequently, the main selecting unit 22 searches for an attribute name with a longest common sequence with respect to "team" of the football player, and calculates a similarity. In this case, however, "team" of the football player includes an alternative name of "current team" with reference to the additional information DB 16; therefore, a similarity is also calculated with respect to the alternative name, and the name with the highest similarity is selected. In this example, a similarity of "LCS(football player. current team, output target table. current team name)/max(length(football player. current team), length(output target table. current team name))" is the highest. In other words, the main selecting unit 22 calculates a similarity="5/6" from "(LCS(football player. current team=5, output target table. current team name=6)=5)/(max(length(football player. current team)=5, length(output target table. current team name)=6)=6".

Subsequently, the main selecting unit 22 searches for an attribute name with a longest common sequence with respect to "date of birth" of the football player, and calculates a similarity. In this case, however, "date of birth" can be converted from "age" with reference to the additional information DB 16; therefore, similarities with respect to "date of birth" and "age" are calculated and "date of birth" or "age" with the highest similarity is selected. In this example, a similarity of "LCS(football player. age, output target table. age)/max(length (football player. age), length(output target table. age))" is the highest. In other words, the main selecting unit 22 calculates a similarity="2/2"=1 from "(LCS (football player. age=2, output target table. age=2)=2)/(max (length(football player. age)=2, length(output target table. age)=2)=2".

Subsequently, the main selecting unit 22 searches for an attribute name with a longest common sequence with respect to "playing position" of the football player, and calculates a similarity. In this example, a similarity of "LCS(football player. playing position, output target table. playing position)/max(length(football player. playing position), length (output target table. playing position))" is the highest. In other words, the main selecting unit 22 calculates a similarity="5/5"=1 from "(LCS(football player. playing position, output target table. playing position)=5)/(max(length (football player. playing position)=5, length(output target table. playing position)=5)=5)".

Subsequently, the main selecting unit 22 searches for an attribute name with a longest common sequence with respect to "dominant foot" of the football player, and calculates a similarity. In this example, a similarity of "LCS(football player. dominant foot, output target table. dominant foot)/ max(length(football player. dominant foot), length(output target table. dominant foot))" is the highest. In other words, the main selecting unit 22 calculates a similarity="3/3"=1 from "(LCS(football player. dominant foot, output target table. dominant foot)=3)/(max(length(football player. dominant foot)=3, length(output target table. dominant foot)=3) =3)".

Then, the main selecting unit 22 calculates a similarity between the category schema of "football player" and the output target table by "a coverage with respect to the output target table×an average of the similarities of the respective attribute schemas". In this example, five out of the six attribute names of the output target table match the attribute names of the category schema of "football player" (for which the above-described similarities are equal to or greater than zero), so that the coverage is 5/6. Therefore, the main selecting unit 22 calculates "(5/6)×((1+5/6+1+1+1)/5) "=0.8055 as the similarity between the category schema of "football player" and the output target table.

Similarly, the main selecting unit 22 calculates a similarity between each of the attribute schemas of the category schema of "volleyball player" and the attribute names of the output target table. Specifically, the main selecting unit 22 calculates a similarity of "1" with respect to "volleyball player. name" because the character string completely matches "output target table. name". Further, the main selecting unit 22 calculates a similarity of "5/6" with respect to "volleyball player. team (alternative name: current team)" because 5 characters of the character string matches "output target table. current team name". The main selecting unit 22 calculates a similarity of "1" with respect to "volleyball player. date of birth (calculable: age)" because the character string completely matches "output target table. age". The main selecting unit 22 calculates a similarity of "1" with respect to "volleyball player. playing position" because the character string completely matches "output target table. playing position". Furthermore, the main selecting unit 22 calculates a similarity of "0" with respect to "volleyball player. height" because the "output target table" does not contain a common character string.

Then, the main selecting unit 22 calculates a similarity between the category schema of "volleyball player" and the output target table by "a coverage with respect to the output target table×an average of the similarities of the respective attribute schemas". In this example, four out of the six attribute names of the output target table match the attribute names of the category schema of "volleyball player", so that the coverage is 4/6. Therefore, the main selecting unit 22 calculates "(4/6)×((1+5/6+1+1+0)/5)"=0.51111 as the similarity between the category schema of "volleyball player" and the output target table.

Similarly, the main selecting unit 22 calculates a similarity between each of the attribute schemas of the category schema of "volleyball team" and the attribute names of the output target table. Specifically, the main selecting unit 22 calculates a similarity of "4/6" with respect to "volleyball team. team name" because the character string has a longest common sequence with respect to "current team name" of the output target table. The main selecting unit 22 calculates a similarity of "0" with respect to "volleyball team. representative" because the output target table does not contain an attribute name with a common sequence. The main selecting unit 22 calculates a similarity of "3/5" with respect to "volleyball team. current league" because the character string has a longest common sequence with respect to "current league name" of the output target table.

Then, the main selecting unit 22 calculates a similarity between the category schema of "volleyball team" and the output target table by "a coverage with respect to the output target table×an average of the similarities of the respective attribute schemas"="(2/6)×((4/6+0+3/5)/3)"=0.14074 as the similarity between the category schema of "volleyball team" and the output target table.

Similarly, the main selecting unit 22 calculates a similarity between each of the attribute schemas of the category schema of "football team" and the attribute names of the output target table. Specifically, the main selecting unit 22 calculates a similarity of "4/6" with respect to "football team. team name" because the character string has a longest common sequence with respect to "current team name" of the output target table. The main selecting unit 22 calculates a similarity of "0" with respect to "football team. representative" because the output target table does not contain an attribute name with a common sequence. The main selecting unit 22 calculates a similarity of "3/5" with respect to "football team. current league" because the character string has a longest common sequence with respect to "league name" of the output target table. The main selecting unit 22 calculates a similarity of "0" with respect to "football team. hometown" because the output target table does not contain an attribute name with a common sequence.

Then, the main selecting unit 22 calculates a similarity between the category schema of "football team" and the output target table by "a coverage with respect to the output target table×an average of the similarities of the respective attribute schemas"="(2/6)×((4/6+0+3/5+0)/4)"≅0.10556 as the similarity between the category schema of "football team" and the output target table.

After calculating the similarities as described above, the main selecting unit 22 selects, as the main category schema, the category schema of "football player" whose similarity is the highest and exceeds a threshold (for example, 0.1). As a result, the main selecting unit 22 associates the attribute schemas of "name, team, playing position, and dominant foot" with the similarities of 1 among the attribute schemas of "name, team, date of birth, playing position, and dominant foot" of the category schema of "football player" with the attribute names of "name, current team name, playing position, and dominant foot" of the output target table, respectively.

Then, the main selecting unit 22 stores information on the associations, information on the selected category schema of "football player", and the like in the selection information DB 17 and notifies the sub selecting unit 23 of these pieces of information. Meanwhile, for example, if the similarities are equal to or lower than the threshold of 0.1, it is determined that a matching category schema is absent. In addition, in the calculation of the similarities as described above, if multiple attribute names with the longest common sequences are present, the attribute name with the highest similarity is selected.

Referring back to FIG. 4, the sub selecting unit 23 is a processing unit that determines a subcategory schema for each of the attribute names that are not associated with the main category schema among the attribute names of the output target table, based on information on a feature of the main category schema and information on the attribute schemas of each of category schemas as determination candidates.

Specifically, the sub selecting unit 23 lists category schemas from the ranges of the attribute schemas contained in the already-associated main category schema, and makes associations using the similarities. Then, the sub selecting unit 23 terminates the process when associations have failed or all of the attribute names of the output target table are associated with the category schemas.

In the example as described above, the sub selecting unit 23 calculates a similarity between a set (partial table) of the attribute names, which are not associated with the attribute schemas of the main category schema of "football player" in the output target table, and a subcategory schema candidate of "football team".

Figure 8:
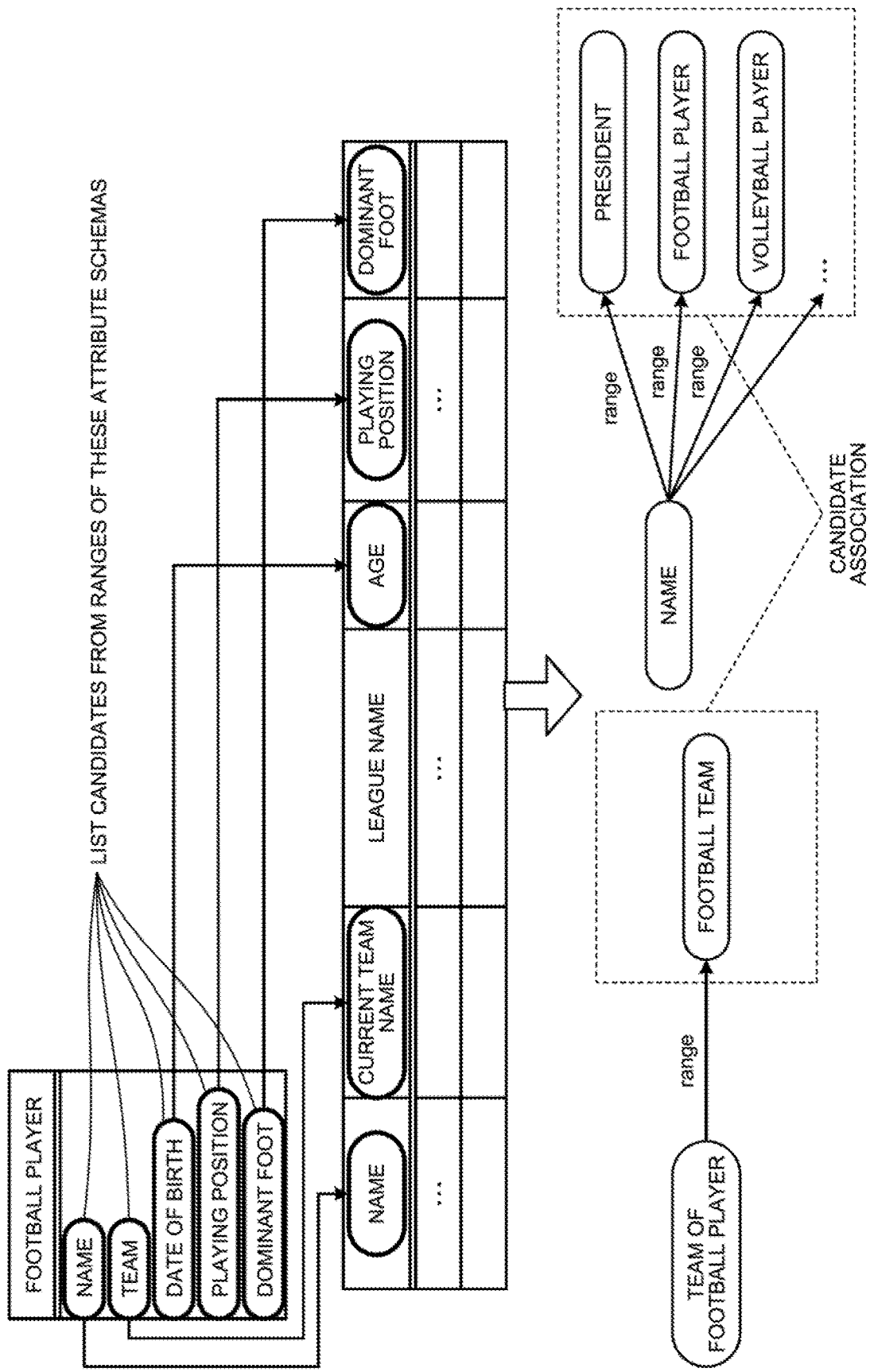
FIG. 8 is a diagram for explaining an example of determination of a subcategory schema after determination of a category schema.

FIG. 8 is a diagram for explaining an example of determination of the subcategory schema after determination of the category schema. As illustrated in FIG. 8, each of the attribute schemas of "name, team, date of birth, playing position, and dominant foot" of the category schema of "football player" is associated with each of the attribute names of "name, current team name, age, playing position, and dominant foot" of the output target table, and therefore, the sub selecting unit 23 refers to the additional information DB 16 and searches for a next association candidate from a range of each of the attribute schemas of "name, team, date of birth, playing position, and dominant foot" of the category schema of "football player". For example, in the state illustrated in FIG. 8, the sub selecting unit 23 adopts a category schema of "football team", a category schema of "president", a category schema of "football player", and a category schema of "volleyball player" as subcategory schema candidates.

However, in the example as described above, because "football player" is already associated with the output target table, the sub selecting unit 23 eliminates candidates that are listed from "name" that contains the football player as the range, and therefore adopts only the football team as a candidate. In this case, the sub selecting unit 23 refers to the category schema DB 15, and identifies the attribute schemas of "team name, representative, current league, and hometown" of the category schema of "football team".

Then, the sub selecting unit 23 performs the similarity calculation as described above with respect to the attribute schema of "league name" that is not associated with the main category schema of "football player" among the attribute names of "name, current team name, league name, age, playing position, and dominant foot" of the output target table, and determines whether the category schema of "football team" is selectable as a subcategory schema. Meanwhile, the attribute name of "current team name" of the output target table is associated with the attribute schema of "team" of the main category schema of "football player", but "football team" is the range of "team" and the attribute schema may be shared; therefore, the attribute name of "current team name" is adopted as a target of the similarity calculation. In other words, the sub selecting unit 23 performs similarity determination on the attribute names of "current team and league name" of the output target table.

Specifically, the sub selecting unit 23 calculates a similarity between each of the attribute schemas of the category schema of "football team" and the attribute names of the output target table in the same manner as adopted by the main selecting unit 22. For example, the sub selecting unit 23 calculates a similarity of "4/6" with respect to "football team. team name" because the character string has a longest common sequence with respect to "current team name" of the output target table. The sub selecting unit 23 calculates a similarity of "0" with respect to "football team. representative" because the output target table does not contain an attribute name with a common sequence. The sub selecting unit 23 calculates a similarity of "3/5" with respect to "football team. current league" because the character string has a longest common sequence with respect to "league name" of the output target table. The sub selecting unit 23 calculates a similarity of "0" with respect to "football team. hometown" because the output target table does not contain an attribute name with a common sequence.

Then, the sub selecting unit 23 calculates a coverage of "(2/2)=1" because the attribute names of "current team and league name" that are similarity determination targets in the output target table cover the attribute schemas (match the character strings) of the category schema of "football player". In addition, the main selecting unit calculates "(4/6+0+3/5+0)/4≅0.31667" as an average of all of the attribute schemas. As a result, the sub selecting unit 23 calculates "a coverage with respect to the output target table×an average of the similarities of the respective attribute schemas"="1×0.31667=0.31667" as the similarity between the category schema of "football team" and the output target table.

Subsequently, the sub selecting unit 23 selects the category schema of "football team" as a subcategory schema because the similarity of the category schema of "football team" that is the subcategory schema candidate is equal to or greater than a threshold. As a result, the sub selecting unit 23 associates the attribute schema of "current league" of the category schema of "football team" with the attribute name of "current team name" of the output target table.

Then, the sub selecting unit 23 stores information on the associations, information on the selected sub category schema of "football team", and the like in the selection information DB 17. Meanwhile, for example, if the similarities are equal to or lower than the threshold of 0.1, it is determined that a matching category schema is absent. In addition, in the calculation of the similarities as described above, if multiple attribute names with the longest common sequences are present, the attribute name with the highest similarity is selected. Furthermore, if multiple ranges are present, the sub selecting unit 23 calculates the similarities as described above for each of the category schemas, and selects the category schema with the highest similarity as the subcategory schema.

The query generating unit 24 is a processing unit that generates a query based on association results obtained by the main selecting unit 22 and the sub selecting unit 23. Specifically, the query generating unit 24 generates a query for reading and acquiring data corresponding to the attribute names of the output target table from the data associated with the attribute schemas of the category schema selected by the main selecting unit 22 and from data associated with the attribute schemas of the subcategory schema selected by the sub selecting unit 23.

For example, assuming that the knowledge graph is stored as linked data, a node and an edge of the knowledge graph are represented by a uniform resource identifier (URI). As one example, "football player" is represented by "http://example/the football player". Then, when each of the category schemas of "football player" and "football team" is selected, the query generating unit 24 is able to generate an SPARQL query as illustrated in FIG. 9 by using SPARQL as a query language. FIG. 9 is a diagram illustrating an example of a query. Then, the query generating unit 24 stores the query as illustrated in FIG. 9 in the query DB 18 or transmits the query to the user terminal 5. Meanwhile, the user terminal 5 is able to acquire data corresponding to the output target table from the knowledge graph by executing the query as illustrated in FIG. 9.

Flow of Process

Next, the flow of a process related to query generation will be described. Here, an entire process, a category schema selection process, and a subcategory schema selection process will be described.

Entire Process

Figure 10:
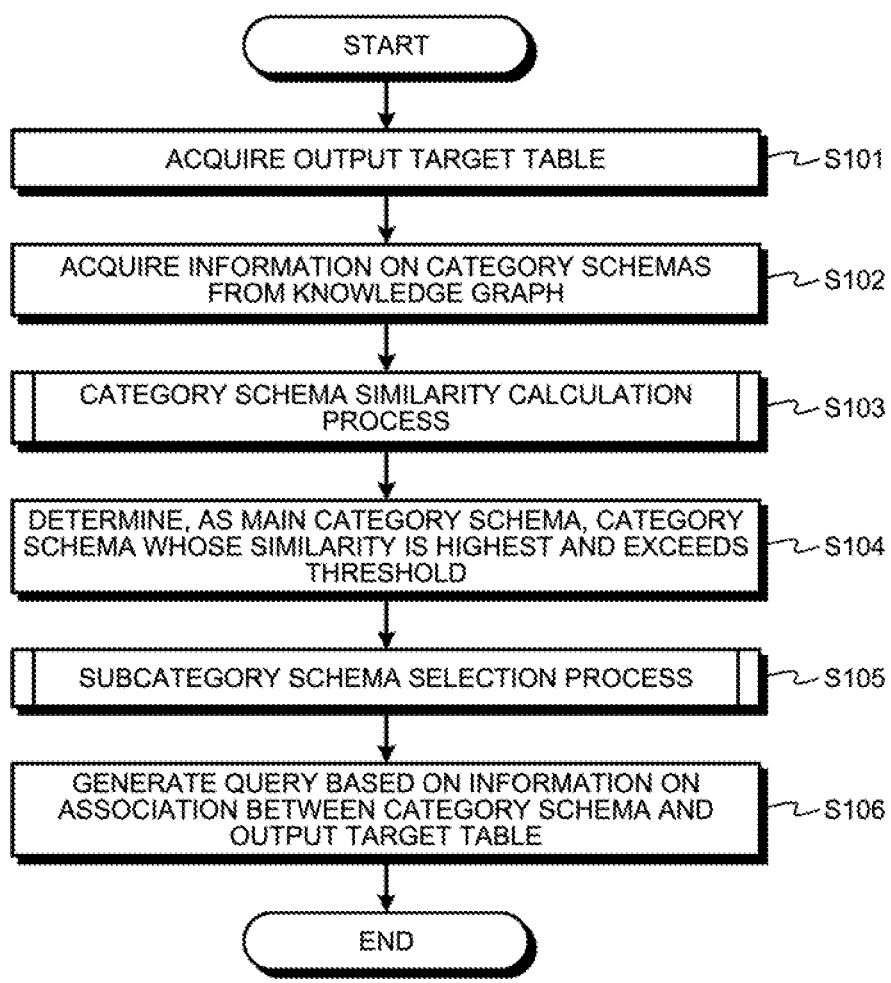
FIG. 10 is a flowchart illustrating the flow of an entire process.

FIG. 10 is a flowchart illustrating the flow of the entire process. As illustrated in FIG. 10, the information acquiring unit 21 acquires the output target table from the user terminal 5 and stores the output target table in the output target information DB 13 (S101). Subsequently, the information acquiring unit 21 acquires information on the category schemas from the knowledge graph, and stores the information in the category schema DB 15 (S102). Meanwhile, the information acquiring unit 21 may acquire information on the knowledge graph from the knowledge graph and store the information in the knowledge graph information DB 14.

Then, the main selecting unit 22 performs a category schema similarity calculation process (S103), and determines a category schema whose similarity is the highest and exceeds the threshold as a main category schema (S104).

Thereafter, the sub selecting unit 23 performs a subcategory schema selection process based on similarity calculation (S105), and the query generating unit 24 generates a query based on information on the association between the category schema and the output target table (S106).

Selection of Category Schema

Figure 11:
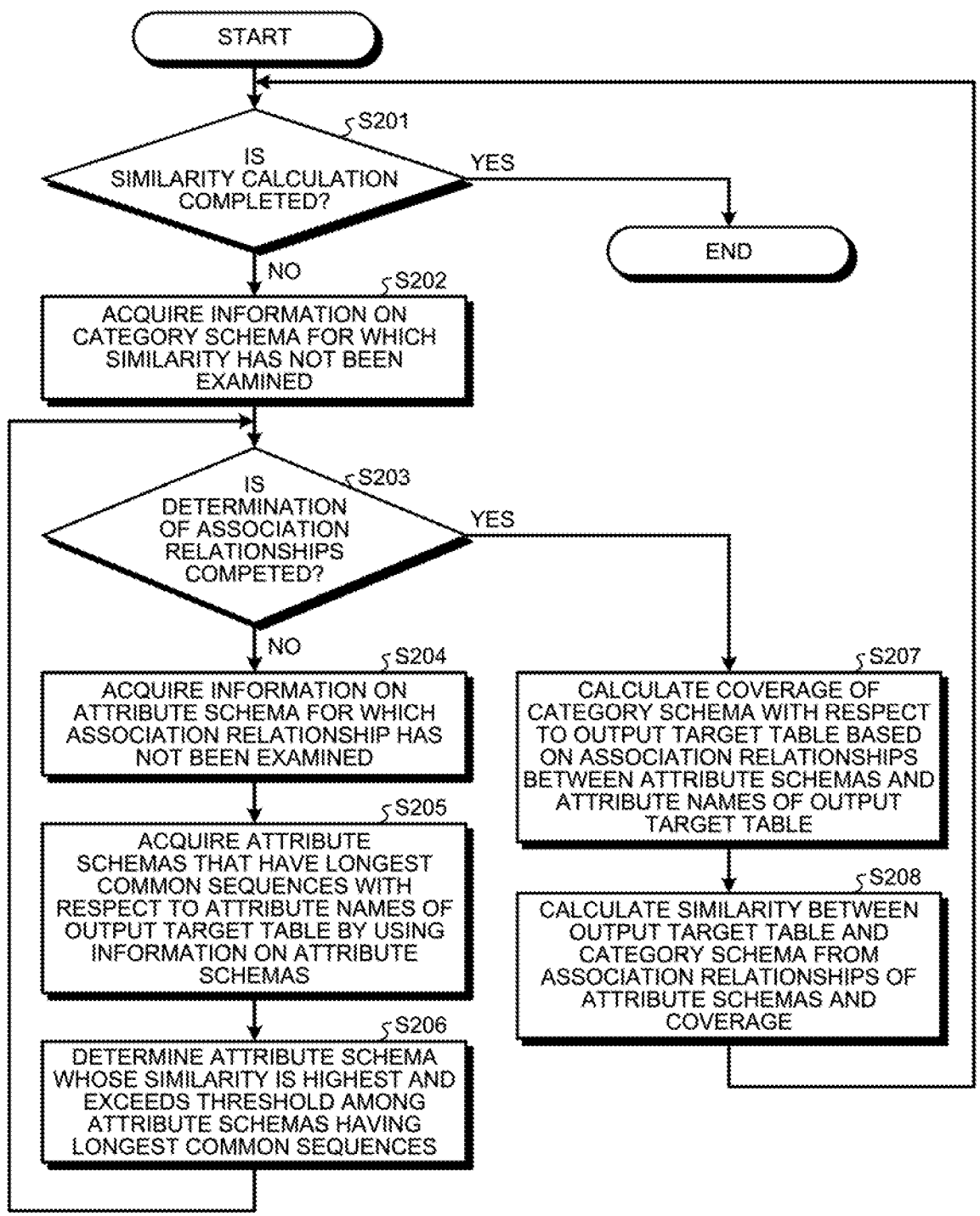
FIG. 11 is a flowchart illustrating the flow of a category schema similarity calculation process.

FIG. 11 is a flowchart illustrating the flow of the category schema similarity calculation process. This process is performed at Step S103 in FIG. 10.

As illustrated in FIG. 11, if the similarity calculation is not completed (S201: No), the main selecting unit 22 acquires information on the category schema for which the similarity has not been examined from the category schema DB 15 or the like (S202). For example, the main selecting unit 22 determines whether the similarities between all of the category schemas and the output target table have been examined. If the calculation is not completed, the process at S202 is performed. If the calculation is completed, the process is terminated and the process at Step S104 in FIG. 10 is performed.

Subsequently, the main selecting unit 22 determines whether determination on association relationships is completed (S203). For example, the main selecting unit 22 determines whether association relationships between all of the attribute schemas of the acquired category schema and the attribute names of the output target table have been examined.

Then, if the determination on the association relationships is not completed (S203: No), the main selecting unit 22 acquires information on the attribute schema for which the association relationship has not been examined (S204). Subsequently, the main selecting unit 22 acquires attribute schemas that have the longest common sequences with respect to the attribute names of the output target table by using the information on the attribute schemas (S205). Then, the main selecting unit 22 selects the attribute schema whose similarity is the highest and exceeds a threshold among the attribute schemas having the longest common sequences, as a corresponding attribute schema (S206). Thereafter, the processes from Step S203 are repeated.

In contrast, at S203, if the determination on the association relationships is completed (S203: Yes), the main selecting unit 22 calculates a coverage of the category schema with respect to the output target table based on the association relationships between the attribute schemas and the attribute names of the output target table (S207). Then, the main selecting unit 22 calculates a similarity between the output target table and the category schema from the association relationships of the attribute schemas and the coverage (S208). Thereafter, the process returns to S201 and the subsequent processes are repeated.

Selection of Subcategory Schema

Figure 12:
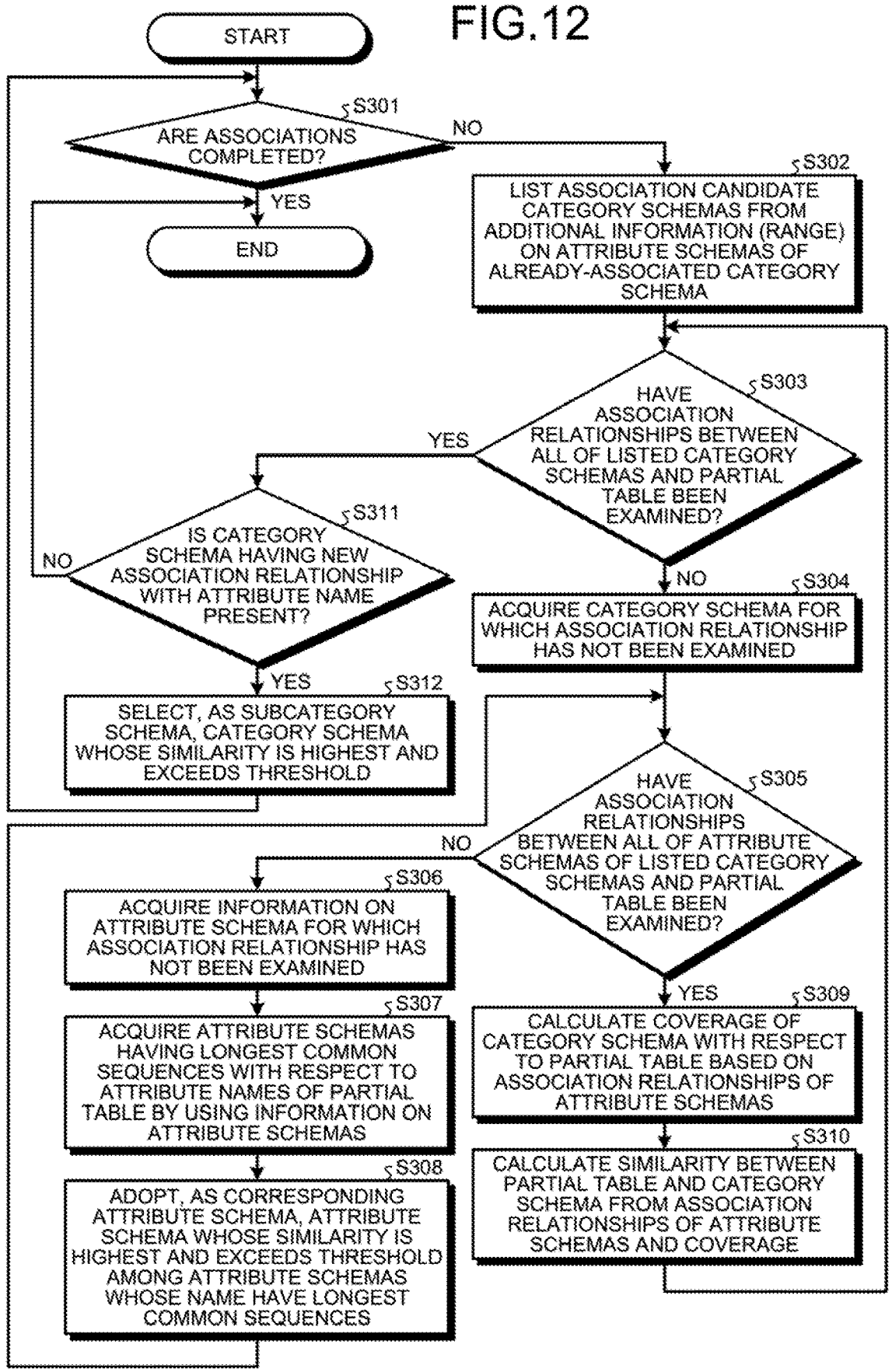
FIG. 12 is a flowchart illustrating the flow of a subcategory schema selection process.

FIG. 12 is a flowchart illustrating the flow of the subcategory schema selection process. This process is performed at Step S105 in FIG. 10.

As illustrated in FIG. 12, if associations are not completed (S301: No), the sub selecting unit 23 lists association candidate category schemas from the additional information (range) on the attribute schemas of the already-associated category schema (S302). For example, the sub selecting unit 23 determines whether all of the attribute names of a partial table, which indicates a part of the output target table for which associations are not completed, have been associated with category schemas. If the associations are not completed, the process S302 is performed. If the associations are completed, the process is terminated and the process at Step S106 in FIG. 10 is performed.

Subsequently, the sub selecting unit 23 determines whether association relationships between all of the listed category schemas and the partial table have been examined (S303). If an association relationship that has not been examined is present (S303: No), the sub selecting unit 23 acquires the category schema for which the association relationship has not been examined (S304).

Thereafter, the sub selecting unit 23 determines whether association relationships between all of the attribute schemas of the listed category schemas and the partial table have been examined (S305). Then, if an association relationship that has not been examined is present (S305: No), the sub selecting unit 23 acquires information on the attribute schema for which the correspondence relationship has not been examined (S306). Subsequently, the sub selecting unit 23 acquires attribute schemas having longest common sequences with respect to the attribute names of the partial table by using the information on the attribute schemas (S307). Then, the sub selecting unit 23 adopts the attribute schema whose similarity is the highest and exceeds a threshold among the attribute schemas whose names have the longest common sequences, as a corresponding attribute schema (S308). Thereafter, the processes from Step S305 are repeated.

In contrast, at S305, if the examination of the association relationships is completed (S305: Yes), the sub selecting unit 23 calculates a coverage of the category schema with respect to the partial table based on the association relationships of the attribute schemas (S309). Then, the sub selecting unit 23 calculates a similarity between the partial table and the category schema from the association relationships of the attribute schemas and the coverage (S310). Thereafter, the process returns to S303 and the subsequent processes are repeated.

In contrast, at S303, if the examination of the association relationships is completed (S303: Yes), the sub selecting unit 23 determines whether a category schema having a new association relationship with the attribute names is present (S311). Here, if a category schema having a new association relationship with the attribute names is not present (S311: No), the sub selecting unit 23 terminates the process. In contrast, if a category schema having a new association relationship with the attribute names is present (S311: Yes), the sub selecting unit 23 selects, as the subcategory schema, a category schema whose similarity is the highest and exceeds a threshold (S312). Thereafter, the process returns to S301 and the subsequent processes are repeated.

Effects

As described above, the query generation apparatus 10 effectively uses a feature of the knowledge graph that includes category schemas capable of flexibly having additional information in a graph format. Then, the query generation apparatus 10, when sequentially determining category schemas to be associated with the output target table, first determines the main category schema and thereafter lists association candidates from the ranges of the additional information included in the already-associated category schema. Thereafter, the query generation apparatus 10 calculates associations between the listed category schemas and the output table, and determines a category schema (subcategory schema) to be associated.

In this manner, the query generation apparatus 10 is able to select a category schema to be associated with the output target table while narrowing down the category schemas. Therefore, the query generation apparatus 10 is able to reduce an error in a query for executing data acquisition. In addition, the query generation apparatus 10 is able to associate the category schema with each of the attribute names of the output target table while reducing the amount of calculations and errors.

[b] Second Embodiment

While the embodiment of the present invention has been described above, the present invention may be embodied in various different forms other than the embodiment as described above. Therefore, other embodiments will be described below.

Similarity Calculation Formula

The similarity calculation formulas explained in the embodiment above are described by way of example only and are not limited to this example but various known methods may be adopted. In addition, the number of category schemas and the thresholds are also described by way of example only, and the settings thereof may be changed arbitrarily.

Subcategory Schema

In the embodiment described above, the example has been described in which the main category schema is first selected and thereafter the subcategory schemas serving as association candidates are selected using the ranges (range) of the attribute schemas included in the main category schema; however, embodiments are not limited to this example. For example, it may be possible to select subcategory schemas serving as association candidates by using additional information, such as weight, other than the range (range).

Inheritance Relationship

For example, when classes or the like are set in each of the category schemas of the knowledge graph, in some cases, an inheritance relationship for inheriting features between the category schemas may be present. In this case, it may be possible to narrow down association candidate category schemas by using the inheritance relationship.

Figure 13:
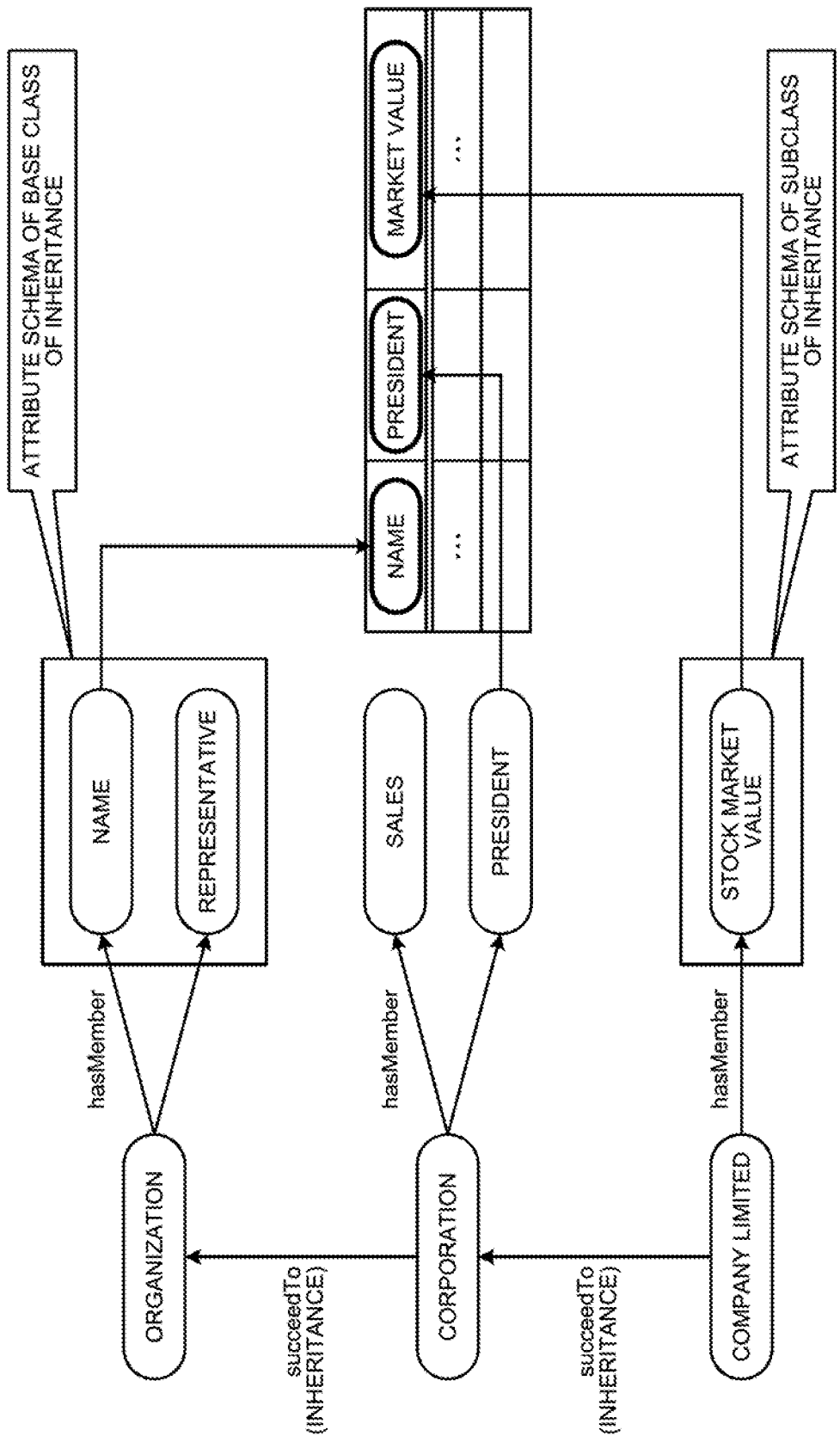
FIG. 13 is a diagram for explaining an example using a category schema inheritance relationship.

FIG. 13 is a diagram for explaining an example using inheritance relationships between category schemas. As illustrated in FIG. 13, an example will be described in which a category schema of "company" is inherited by a category schema of "company limited", and a category schema of "organization" is inherited by the category schema of "company". In this case, it is assumed that the query generation apparatus 10 identifies "company limited" as a category schema that has the highest similarity among the category schemas.

Accordingly, when selecting a subcategory schema, the query generation apparatus 10 performs determination using a similarity with respect to the category schema of "company" that is inherited by the category schema of "company limited". At this time, when a plurality of category schemas serving as bases of inheritance are present, the query generation apparatus 10 performs determination on each of the category schemas serving as bases of inheritance using similarities. In this manner, the query generation apparatus 10 is able to narrow down the association candidate category schemas by using the inheritance relationship.

In the example illustrated in FIG. 13, an attribute schema of "stock market value" of the category schema of "company limited" is associated with an attribute name of "market value" of the output target table, and thereafter an attribute schema of "president" of the category schema of "company" having the inheritance relationship is associated with an attribute name of "president" of the output target table. Thereafter, an attribute schema of "name" of the category schema of "organization" having a further inheritance relationship is associated with an attribute name of "name" of the output target table.

In addition, when an attribute schema that is available as a target subcategory schema is not present, the query generation apparatus 10 narrows down the association candidate category schemas by using inheritance relationships between category schemas. For example, when a category schema with a similarity equal to a threshold is not present, the query generation apparatus 10 may determine, as a subcategory schema, a category schema inheriting from the main category schema, or may determine a subcategory schema by calculating the above-described similarity for each of the category schemas inheriting from the main category schema. As a result, in some cases, it may be possible to make associations more appropriately.

System

The processing procedures, control procedures, specific names, and information including various kinds of data and parameters illustrated in the above-described document and drawings may be arbitrarily changed unless otherwise specified.

In addition, the components illustrated in the drawings are functionally conceptual and do not necessarily have to be physically configured in the manner illustrated in the drawings. In other words, specific forms of distribution and integration of the apparatuses are not limited to those illustrated in the drawings. That is, all or part of the apparatuses may be functionally or physically distributed or integrated in arbitrary units depending on various loads or use conditions. For example, it may be possible to realize a processing unit that displays an item and a processing unit that estimates selection by separate bodies. Further, for each processing function performed by each apparatus, all or any part of the processing functions may be implemented by a CPU and a program analyzed and executed by the CPU or may be implemented as hardware by wired logic.

Hardware Configuration

Figure 14:
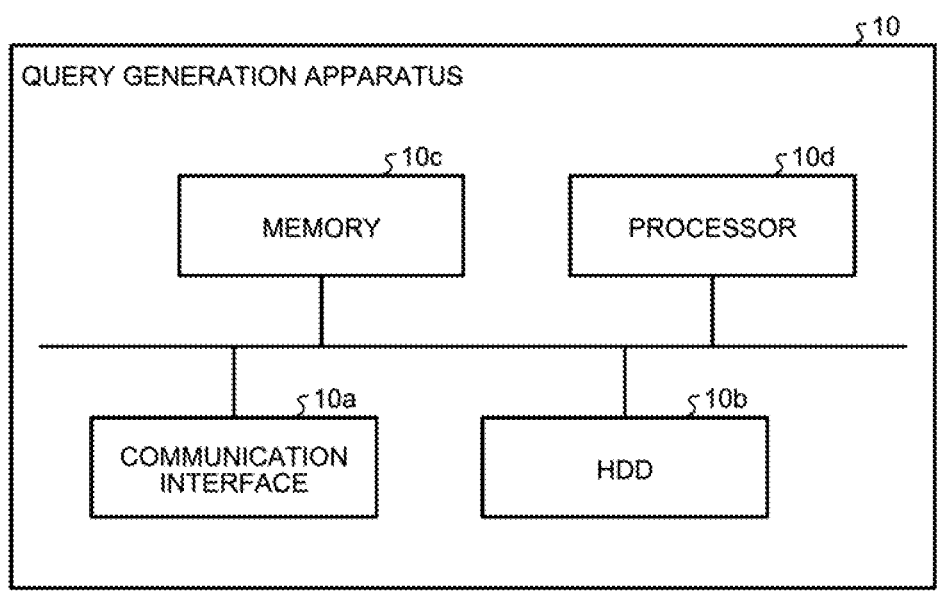
FIG. 14 is a diagram for explaining a hardware configuration example.

FIG. 14 is a diagram for explaining a hardware configuration example. As illustrated in FIG. 14, the query generation apparatus 10 includes a communication interface 10a, a hard disk drive (HDD) 10b, a memory 10c, and a processor 10d.

The communication interface 10a is a network interface card or the like that controls communication with other apparatuses. The HDD 10b is one example of a storage device that stores therein a program, data, and the like.

Examples of the memory 10c includes a random access memory, such as a synchronous dynamic random access memory, a read only memory (ROM), and a flash memory. Examples of the processor 10d include a central processing unit (CPU), a digital signal processor (DSP), a field programmable gate array (FPGA), and a programmable logic device (PLD).

Further, the query generation apparatus 10, by reading and executing the program, functions as an information processing apparatus that implements the query generation method. In other words, the query generation apparatus 10 executes a program that implements the same functions as those of the information acquiring unit 21, the main selecting unit 22, the sub selecting unit 23, and the query generating unit 24. As a result, the query generation apparatus 10 is able to execute the processes that implement the same functions as those of the information acquiring unit 21, the main selecting unit 22, the sub selecting unit 23, and the query generating unit 24. The program described in the present embodiment need not always be executed by the query generation apparatus 10. For example, even when a different computer or server executes the program or even when the different computer and server execute the program in cooperation with each other, it is possible to apply the present invention in the same manner.

According to one embodiment, it is possible to reduce errors in a query for executing data acquisition.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a query generation program that causes a computer to execute a process comprising:
   determining, from a plurality of category schemas each being a set of attribute schemas, a main category schema to be associated with an output target table that defines acquisition target data, based on attribute names of a plurality of output items contained in the output target table;
   determining a subcategory schema to be associated with an un-associated item, which is an output item that is not associated with the main category schema among the plurality of output items, from category schemas that are associated with respective features of a plurality of attribute schemas contained in the main category schema;
   generating queries with respect to the plurality of category schemas based on the main category schema and the subcategory schema;
   calculating, when a plurality of category schemas associated with a predetermined feature that is designated in advance among features of the plurality of attribute schemas contained in the main category schema are present, similarities between the attribute names of the attribute schemas contained in each of the category schemas and an attribute name of the un-associated item of the output target table; and
   determining a category schema with a highest similarity as the subcategory schema.

2. The non-transitory computer-readable recording medium according to claim 1, wherein the process further includes:
   calculating similarities between attribute names of the attribute schemas contained in each of the category schemas and the attribute names of the output target table, for each of the category schemas; and
   determining a category schema with a highest similarity as the main category schema.

3. The non-transitory computer-readable recording medium according to claim 1, wherein the process further includes determining, when a category schema with a similarity equal to or higher than a threshold is not present, the subcategory schema from a category schema that has an inheritance relationship to inherit a feature of the main category schema.

4. The non-transitory computer-readable recording medium according to claim 1, wherein the process further includes generating the query for reading data corresponding to each of the output items contained in the output target table from among a plurality of pieces of data stored in the main category schema and a plurality of pieces of data stored in the subcategory schema.

5. A query generation method comprising:
determining, from a plurality of category schemas each being a set of attribute schemas, a main category schema to be associated with an output target table that defines acquisition target data, based on attribute names of a plurality of output items contained in the output target table;
determining a subcategory schema to be associated with an un-associated item, which is an output item that is not associated with the main category schema among the plurality of output items, from category schemas that are associated with respective features of a plurality of attribute schemas contained in the main category schema, by a processor;
generating queries with respect to the plurality of category schemas based on the main category schema and the subcategory schema;
calculating, when a plurality of category schemas associated with a predetermined feature that is designated in advance among features of the plurality of attribute schemas contained in the main category schema are present, similarities between the attribute names of the attribute schemas contained in each of the category schemas and an attribute name of the un-associated item of the output target table; and
determining a category schema with a highest similarity as the subcategory schema.

6. A query generation apparatus comprising:
a processor configured to:
determine, from a plurality of category schemas each being a set of attribute schemas, a main category schema to be associated with an output target table that defines acquisition target data, based on attribute names of a plurality of output items contained in the output target table;
determine a subcategory schema to be associated with an un-associated item, which is an output item that is not associated with the main category schema among the plurality of output items, from category schemas that are associated with respective features of a plurality of attribute schemas contained in the main category schema;
generate queries with respect to the plurality of category schemas based on the main category schema and the subcategory schema;
calculating, when a plurality of category schemas associated with a predetermined feature that is designated in advance among features of the plurality of attribute schemas contained in the main category schema are present, similarities between the attribute names of the attribute schemas contained in each of the category schemas and an attribute name of the un-associated item of the output target table; and
determining a category schema with a highest similarity as the subcategory schema.

* * * * *